(12) United States Patent
Zennaro et al.

(10) Patent No.: US 9,076,061 B2
(45) Date of Patent: Jul. 7, 2015

(54) SYSTEM AND METHOD FOR UPDATING GEOGRAPHIC DATA

(75) Inventors: Marco Zennaro, San Francisco, CA (US); Luc Vincent, Palo Alto, CA (US); Kong Man Cheung, San Francisco, CA (US); David Abraham, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 305 days.

(21) Appl. No.: 13/445,352

(22) Filed: Apr. 12, 2012

(65) Prior Publication Data

US 2015/0139482 A1 May 21, 2015

Related U.S. Application Data

(60) Provisional application No. 61/609,661, filed on Mar. 12, 2012.

(51) Int. Cl.
*G06K 7/10* (2006.01)
*G06F 7/04* (2006.01)
*G06K 9/32* (2006.01)
*G06F 17/28* (2006.01)
*G06F 17/30* (2006.01)

(52) U.S. Cl.
CPC ............. *G06K 9/3258* (2013.01); *G06F 17/28* (2013.01); *G06F 17/30345* (2013.01); *G06F 17/30702* (2013.01); *G06F 17/30289* (2013.01)

(58) Field of Classification Search
None
See application file for complete search history.

(56) References Cited

U.S. PATENT DOCUMENTS

| | | | |
|---|---|---|---|
| 2007/0140595 A1* | 6/2007 | Taylor et al. | 382/310 |
| 2008/0212901 A1* | 9/2008 | Castiglia et al. | 382/311 |
| 2010/0031330 A1* | 2/2010 | Von Ahn et al. | 726/5 |
| 2010/0218111 A1* | 8/2010 | Mitchell et al. | 715/745 |

OTHER PUBLICATIONS

Steinbach et al. "Soylent Grid: it's made of people!", ICCV 2007.*
Oosterman et al. "Geolocation on the iPhone by automatic street sign reading", IVCNZ 2010.*
Khot et al. "iCAPTCHA: image tagging for free", USID 2009.*
Wang et al. "Word spotting in the wild", ECCV 2010.*
Ahn, Luis Von et al., "reCAPTCHA: Human-Based Character Recognition via Web Security Measures," Science, vol. 321, Sep. 12, 2008, downloaded from www.sciencemag.org on Sep. 12, 2008, pp. 1465-1468.

* cited by examiner

*Primary Examiner* — Anand Bhatnagar
*Assistant Examiner* — Soo Park
(74) *Attorney, Agent, or Firm* — Dority & Manning, P.A.

(57) ABSTRACT

According to one aspect, embodiments of the invention provide a system and method for utilizing the effort expended by a user in responding to a CAPTCHA request to automatically transcribe text from images in order to verify, retrieve and/or update geographic data associated with geographic locations at which the images were recorded.

19 Claims, 5 Drawing Sheets

SYSTEM AND METHOD FOR UPDATING GEOGRAPHIC DATA

CROSS REFERENCE TO RELATED APPLICATIONS

This application claims priority under 35 U.S.C. §119(e) to U.S. Provisional Application Ser. No. 61/609,661 entitled "SYSTEM AND METHOD FOR UPDATING GEOGRAPHIC DATA" filed on Mar. 12, 2012, which is incorporated by reference herein in its entirety.

BACKGROUND OF THE DISCLOSURE

1 Field of the Invention

Aspects of the present invention relate to a system and method for updating geographic data based on text retrieved from imagery and transcribed using a CAPTCHA system.

2. Discussion of Related Art

Completely Automated Public Turing test to tell Computer and Humans Apart (CAPTCHA) systems are security measures that prevent automated programs from abusing online services. A CAPTCHA system operates by requiring a user to perform a task that a computer cannot perform. For example, one common type of CAPTCHA system requires a user to copy text from a distorted image that appears on the screen. Because computers are assumed to be unable to decipher the distorted image, any user entering a correct solution is presumed to be human.

SUMMARY

As described above, CAPTCHA systems are common security measures that prevent automated programs from abusing online services by requiring a user to perform a task (e.g., such a copying text) that a computer cannot perform. Embodiments described herein provide a system and method for utilizing the effort expended by a user in responding to a CAPTCHA request to transcribe text from images in order to verify, retrieve and/or update geographic information associated with geographic locations at which the images were recorded.

The identification and verification of geographic information is generally a difficult task as it may require an individual to personally visit a geographic site in order to retrieve and/or verify information related to the geographic site (e.g., such as the street number, building number, building name, business name, operating hours etc. at the site). This may be a labor-intensive and expensive task as the individual must take the time to personally inspect each desired site and record the necessary information about the site and the individual is typically compensated for this time. Rather than actually visiting different sites, individuals may also attempt to gain and verify geographic information related to a site by inspecting images of the site. However, such images are typically not of a high enough resolution to provide accurate and/or complete information and the individuals still may have to take the time to individually inspect each desired image (i.e. each desired site) for desired geographic information (e.g., text of interest such as street numbers, building numbers, building names, business names etc. that provide additional geographic information) In addition to being labor-intensive and costly, such processes may also be inaccurate as the chance of human error is relatively high.

Therefore, various embodiments as described herein provide a system and method for utilizing the effort expended by a user in responding to a CAPTCHA request to automatically transcribe text from images in order to verify, retrieve and/or update geographic data associated with geographic locations at which the images were recorded.

Aspects in accord with the present invention are directed to a method for updating geographic data associated with a geographic location, the method comprising receiving at least one image recorded at the geographic location, identifying an area within the at least one image, the area including text, transmitting the area to a Completely Automated Public Turing text to tell Computer and Humans Apart (CAPTCHA) system, receiving a set of transcription attempts from the CAPTCHA system, analyzing the set of transcription attempts, generating a transcription of the text based on the act of analyzing, and updating the geographic data associated with the geographic location based on the transcription of the text.

According to one embodiment, the act of identifying an area includes identifying coordinates of the location of the area within the at least one image. In another embodiment, the act of updating geographic data includes updating at least one of a building name, business name, and a building number associated with the geographic location based on the transcription of the text.

According to another embodiment, the act of transmitting includes selectively transmitting the area to a CAPTCHA system based on the geographic location. In one embodiment, the method further comprises filtering the set of transcription attempts to remove erroneous transcription attempts. In one embodiment, the act of filtering is based on the geographic location. In another embodiment, the area includes a box. According to one embodiment, the act of analyzing includes acts of comparing the transcription attempts within the set, and determining whether a pre-defined number of transcription attempts match each other. In one embodiment, the act of generating includes, in response to a determination that the pre-defined number of transcription attempts match, generating the transcription of the text based on the matched transcription attempts.

According to another embodiment, the act of analyzing includes acts of comparing the transcription attempts within the set, and determining whether a pre-defined percentage of transcription attempts match each other. In one embodiment, the act of generating includes, in response to a determination that the pre-defined percentage of transcription attempts match, to generating the transcription of the text based on the matched transcription attempts.

According to one embodiment, the method further comprises adjusting at least one of the size, shape, and aspect ratio of the area. In another embodiment, the at least one image is a photographic image.

Another aspect in accord with the present invention is directed to a system for updating geographic data associated with a geographic location, the system comprising, an input configured to receive at least one image recorded at the geographic location, an extraction component configured to encode the at least one image with an identification of an area within the image that includes text, a clipping component configured to remove the area from the at least one image, an interface configured to transmit the area to a CAPTCHA system and to receive a set of transcription attempts from the CAPTCHA system, a merging component configured to analyze the set of transcription attempts received from the CAPTCHA system and generate a transcription of the text based on the analysis of the set of transcription attempts, and a database configured to receive the transcription of the text and in response, update the geographic data associated with the geographic location stored within the database.

According to one embodiment, the CAPTCHA system is a reCAPTCHA system. In another embodiment, the system further comprises a filter component configured to filter out erroneous transcription attempts from the set of transcription attempts. In one embodiment, the image is further encoded with the geographic location. In another embodiment, the filter component is further configured to filter the set of transcription attempts based on the geographic location.

According to one embodiment, the system further comprises a scaling component configured to adjust at least one of the size, shape, and aspect ratio of the area.

One aspect in accord with the present invention is directed to a computer readable medium comprising computer-executable instructions that when executed on a processor performs a method for updating geographic data associated with a geographic location, the method comprising acts of receiving at least one image recorded at the geographic location, identifying an area within the at least one image, the area including text, displaying the area to a plurality of users, recording a set of transcription attempts from the plurality of users, analyzing the set of transcription attempts, generating a transcription of the text based on the act of analyzing, and updating the geographic information related to the geographic location based on the transcription of the text.

BRIEF DESCRIPTION OF DRAWINGS

The accompanying drawings are not intended to be drawn to scale. In the drawings, each identical or nearly identical component that is illustrated in various FIGs. is represented by a like numeral. For purposes of clarity, not every component may be labeled in every drawing. In the drawings.

DETAILED DESCRIPTION

Figure 1A:
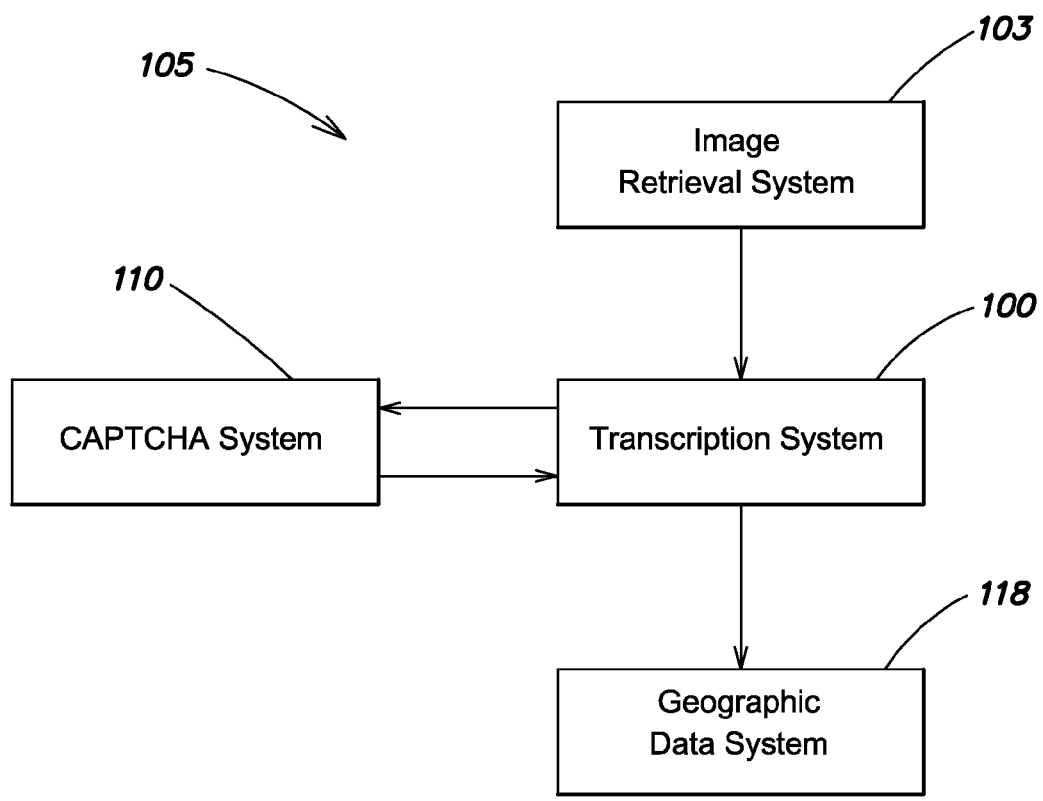
FIG. 1A is a block diagram of a system for retrieving, verifying, and/or updating geographic information by utilizing a CAPTCHA system to transcribe text from images in accordance with one embodiment of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1A is a block diagram of a system 105 for retrieving, verifying, and/or updating geographic information by utilizing a CAPTCHA system to transcribe text from images in accordance with one embodiment of the present invention. The system 105 includes a transcription system 100 in communication with an image retrieval system 103, a geographic data system 118 and a CAPTCHA system 110.

According to one embodiment, the image retrieval system 103 retrieves photographic images. In one embodiment, the image retrieval system 103 retrieves street view photographic images. Each one of the retrieved street view images is a street level image (e.g., ground level view) of the street (and adjacent area including buildings, signs, etc.) on which the camera recording the image is located. According to one embodiment, the street view images are 360 degree panorama thumbnails of the street and areas immediately adjacent to the street on which the camera is recording the images.

For example, in one embodiment street view images may be recorded by a camera of the image retrieval system 103 located on a vehicle. As the vehicle traverses a street within a geographic area, the camera located on the vehicle automatically records images of the street and adjacent areas. The images are uploaded to a database of the image retrieval system 103 for later image processing and analysis. According to one embodiment, in addition to the street view images, geographic position and orientation information of the vehicle and camera (e.g., obtained from a Global Positioning System (GPS) within the vehicle) is also associated with each street view image and uploaded to the database of the image retrieval system 103.

According to other embodiments, any other type of photographic image may be retrieved by the image retrieval system 103. For example, in one embodiment, the photographic images retrieved by the image retrieval system 103 are recorded from within the interior of a building. The image retrieval system 103 transmits the retrieved images to the transcription system 100.

Figure 1B:
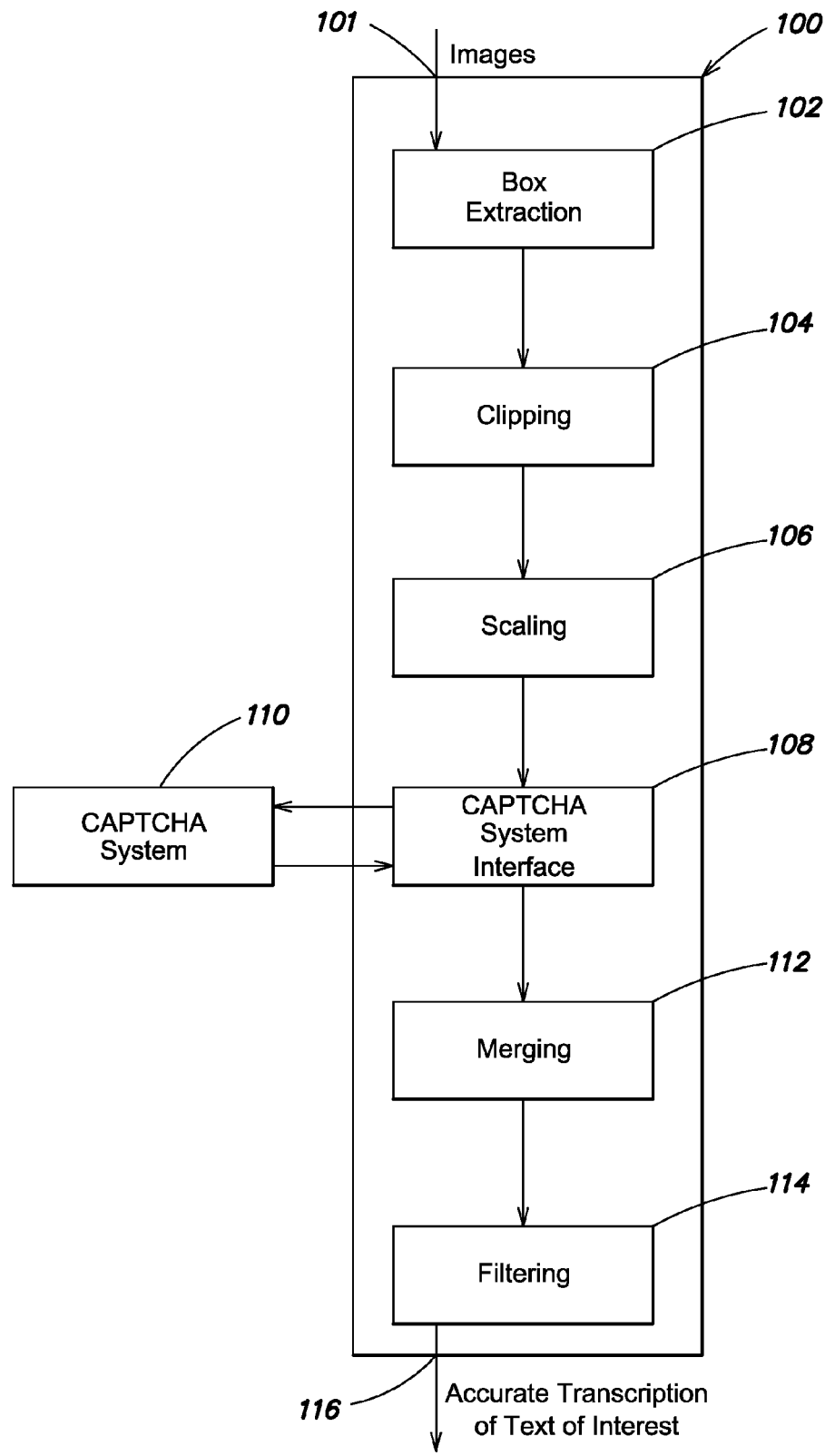
FIG. 1B is a block diagram of a system for transcribing text from imagery using a CAPCHA system in accordance with one embodiment of the present invention.

FIG. 1B is a block diagram of the transcription system 100 for automatically transcribing text from received imagery using a CAPCHA system in accordance with one embodiment of the present invention. The transcription system 100 includes an input 101 configured to communicate with the image retrieval system 103, a box extraction component 102 in communication with the input 101, a clipping component 104 in communication with the box extraction component 102, a scaling component 106 in communication with the clipping component 104, a CAPTCHA system interface 108 in communication with the scaling component 106 and configured to communicate with an external CAPTCHA system 110, a merging component 112 in communication with the CAPTCHA system interface 108, a filtering component 114 in communication with the merging component 112, and an output 116 in communication with the filtering component 114 and the geographic data system 118.

The input 101 is configured to receive images (including any corresponding geographic information) from the image retrieval system 103. As discussed above, according to one embodiment, the images received at the input 101 from the image retrieval system 103 are photographic street view images of geographic locations. The images received at the input 101 to are communicated to the box extraction component 102.

Upon receiving an image from the input 101, the box extraction component 102 identifies the location of any text of interest (i.e. text which may provide geographic information related to the image such as street names, street numbers, building numbers, building names, business names, floor numbers, office names, etc.) within the image.

According to one embodiment, the box extraction component 102 automatically scans each received image to determine which images include text of interest. The box extraction component 102 scans each image to identify portions of each image that contain text of interest. For example, according to one embodiment, the box extraction component 102 divides each image of the set into different portions. In one embodiment, the box extraction component 102 divides each image into different boxes; however, in other embodiments, the different portions may be of any desired shape. The box extraction component 102 systematically scans the boxes of each image and scores each box within each image using a machine-learning classifier trained (using a collection of boxes with and without text) to determine which boxes contain text of interest. An image containing a box with a score indicating the presence of text is encoded with coordinates identifying the location of the box within the image (and hence the location of the text).

According to another embodiment, the box extraction component 102 is located within the image retrieval system 103 and images including text of interest are identified and encoded with coordinates identifying the location of the text of interest, prior to the images being transmitted to the transcription system 100.

According to other embodiments, any other appropriate method of identifying the presence of text within an image may be utilized. For example, in one embodiment, rather than the automatic system discussed above, the image retrieval system 103 utilizes a manual system to identify the presence of text within an image and the location of specific portions of the image that contain the text. According to one embodiment, in such a system, an individual may manually inspect each image and record the presence and location of any text of interest within each image.

The images, including text of interest, are communicated from the box extraction component 102 to the clipping component 104. As discussed above, each image received at the clipping component 104 is encoded with coordinates identifying the portion of the image containing the text of interest. For example, according to one embodiment, each image received at the clipping component 104 is encoded with coordinates identifying a box portion of the image containing the text of interest. In other embodiments, the portion of the image identified by the coordinates may be of any desired shape.

According to one embodiment, in addition to coordinate information, each image received by the clipping component 104 may also be encoded with the geographic information from the image retrieval system 103 (e.g., the geographic location of where the text of interest was recorded or the building within which the text of interest was recorded).

Upon receiving an image (including corresponding box coordinates and any corresponding geographic information) the clipping component 104 cuts out or removes the box from the image. According to one embodiment, the scaling component 106 adjusts the clipped box to conform to any requirements of the CAPTCHA system 110 to which the box is going to be sent. For example, the scaling component 106 may adjust parameters of the box such as aspect ratio, size, shape, or scale.

Figure 2:
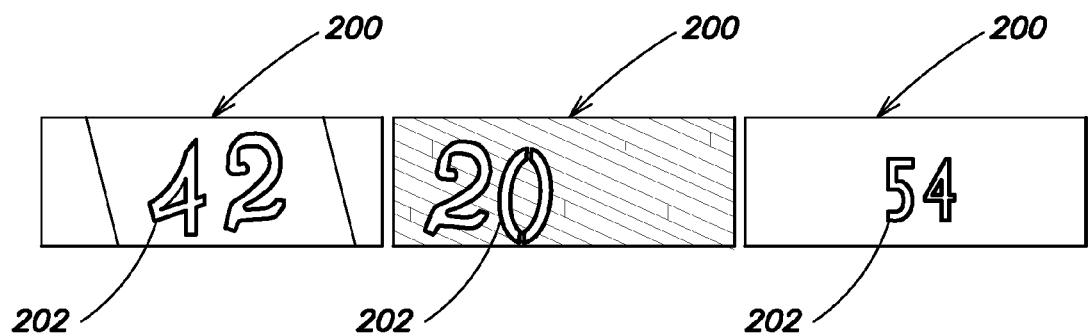
FIG. 2 illustrates examples of boxes including text of interest clipped from images in accordance with one embodiment of the present invention.

FIG. 2 illustrates examples of boxes 200 including text of interest 202 cut from images in accordance with one embodiment of the present invention. As seen in FIG. 2, each box 200 is cut from an image so that the text 202 is a central feature of the box 200.

The CAPTCHA system interface 108 receives boxes from the scaling component 106 and transmits the boxes to the CAPTCHA system 110. According to one embodiment, the CAPTCHA system used may include the reCAPTCHA system available commercially from Google Inc., of Mountain View, Calif.; however, in other embodiments, it should be appreciated that any other CAPTCHA or crowd sourcing system may be utilized. According to one embodiment, the CAPTCHA system 110 is located externally from the transcription system 100. In such an embodiment, the CAPTCHA system interface 108 may communicate with the CAPTCHA system via a network (e.g., such as the internet or any other appropriate network).

According to one embodiment, the CAPTCHA system interface 108 makes a determination to transmit a boxed image or other image portion type to one CAPTCHA system out of a group of CAPTCHA systems. In one embodiment, the CAPTCHA system interface 108 utilizes geographic information received with a box to determine which CAPTCHA system the CAPTCHA system interface 108 transmits the box to. For example, in one embodiment, geographic information encoded with a box indicating that the text within the box was recorded in a certain country results in the CAPTCHA system interface 108 transmitting the box to a CAPTCHA system within the same country (or to CAPTCHA system within a country that speaks the same language).

The CAPTCHA system 110 receives boxes from the transcription system 100 (i.e. via the CAPTCHA system interface 108) and stores the boxes in storage (e.g., a memory device, storage location, server, or the like). When an individual utilizing an interface (e.g., browsing the internet with a computer) desires to perform a task requiring CAPTCHA authentication, the CAPTCHA system 110 in communication with the interface retrieves a box from storage and displays the box to the user via a display (e.g., via a monitor of the computer). According to one embodiment, the CAPTCHA system 110 distorts the image associated with the box prior to displaying the box to the user.

According to one embodiment, in addition to displaying a box from the transcription system 100, the CAPTCHA system 110 also displays control text. In one embodiment, control text is text having substance that the CAPTCHA system 110 has already confirmed, or been pre-programmed with. For example, control text may be a box of text originally from the transcription system 100 that has already passed through the transcription system 100 and the substance of which has previously been confirmed. In another example, the control text may be any other portion of text (e.g., a word), the substance of which has previously been confirmed (or pre-programmed) by the CAPTCHA system 110.

The CAPTCHA system 110 requests that the individual required to provide CAPTCHA authentication copy the displayed text (i.e. the box from transcription system 100 and the control text). The CAPTCHA system 110 records an attempt by the individual to copy the text of the box from transcription system 100 and transmits the attempt back to the transcription system 100. The CAPTCHA system 110 also compares the attempt by the individual to copy the text of the control text to the previously confirmed (or pre-programmed) text of the control text. If the individuals attempt at copying the control text does not match the confirmed text of the control text, then the CAPTCHA system 110 displays another box from transcription system 100 and additional control text and requests that the individual copy the new displayed text. If the individuals attempt to copy the text of the control text matches the confirmed text of the control text, then the CAPTCHA system 110 considers the individual a verified non-computer user and the individual is allowed to continue with the desired task that required CAPTCHA authentication. In other embodiments, the CATPCHA system 110 may use any appropriate method for confirming that the individual is a non-computer user.

The CAPTCHA system interface 108 receives attempts by individuals to copy text of boxes previously sent to the CAPTCHA system 110 by the transcription system 100. The merging component 112 compiles the received attempts, correlates the received attempts to their corresponding box and keeps track of the number of attempts corresponding to each box.

The filtering component 114 filters the received attempts for each box to eliminate erroneous attempts and to provide enhanced accuracy and efficiency. For example, in one embodiment, the filtering component 114, knowing that the text within the box sent to the CAPTCHA system 110 is numeric (e.g., a building number), can immediately eliminate any attempt that is non-numeric. In another embodiment, the filtering component 114 can immediately eliminate attempts that are considered profane. In another embodiment, the filtering component 114 can filter the received attempts against a given vocabulary.

In another embodiment, based on the geographic location information associated with the box (as discussed above), the filtering component 114 can immediately eliminate any attempt that is clearly incorrect (i.e. outside of the domain of the identified geographic location). For example, based on geographic information identifying that the text of a box was recorded on a specific street and knowing that building numbers on the specific street only range from 1 to 100, the filtering component can immediately eliminate any attempt outside of that range. Similarly, based on geographic information identifying that the text of a box was recorded within a certain building and knowing office numbers within the building range from 1 to 500, the filtering component can immediately eliminate any attempt outside of that range.

According to other embodiments, the filtering component 114 may be configured to filter compiled attempts based on any other appropriate criteria. In another embodiment, the filtering component 114 is optional and the attempts compiled by the merging component 112 are not subjected to the filter component 114.

Through the merging 112 and filtering 114 components, each box (previously sent to the CAPTCHA system 110) is associated with a set of attempts. The merging component 112 monitors each set of attempts to determine when the substance of the text within a box can be confirmed based on the set of attempts associated with the box.

According to one embodiment, the merging component 112 analyzes the set of attempts associated with a box and determines if a pre-defined number of attempts are the same. If a pre-defined number of attempts associated with a box are the same, then the substance of the repeated attempts is identified as the confirmed substance of the text within the box. For example, in one embodiment, the pre-defined number of attempts is three. If the merging component 112 identifies that three of the attempts within a set of attempts are the same, then the substance of the three attempts is confirmed as the substance of the text within the box related to the set. Upon confirming the substance of the text within a box, the confirmed text transcription is output by the transcription system 100. In other embodiments, the pre-defined number of repetitive attempts may be defined as any number.

According to another embodiment, rather than basing the confirmation of text on a pre-defined number of repetitious attempts, the merging component 112 bases text confirmation on the percentage of attempts within a set that are the same. In one embodiment, the merging component 112 analyzes the set of attempts associated with a box and determines if a pre-defined percentage of the attempts are the same. If a pre-defined percentage of attempts associated with a box are the same, then the substance of the repeated attempts is identified as the confirmed substance of the text within the box. For example, in one embodiment, the pre-defined percentage is 90%. If the merging component 112 identifies that 90% of the attempts within a set related to a box are the same, then the substance of the repetitive attempts is confirmed as the substance of the text within the box. Upon confirming the substance of the text within a box, the confirmed text transcription is output by the transcription system 100. In other embodiments, the pre-defined percentage may be defined as any percentage.

According to one embodiment, the CAPTCHA system 110 will continue to utilize (i.e. display) a box, retrieve attempts from individuals related to the box, and transmit attempts to transcribe the text within the box to the transcription system 100 (via the CAPTCHA system interface 108) until the CAPTCHA system 110 is informed by the transcription system 100 that the text within the box has been confirmed. In another embodiment, the CAPTCHA system 110 will utilize (i.e. display) a box, retrieve attempts from individuals related to the box, and transmit attempts to transcribe the text within the box to the transcription system 100 (via the CAPTCHA system interface 108) until a pre-defined number of attempts have been recorded. In such an embodiment, if the transcription system 100 confirms the substance of the text within a box prior to the pre-defined number of attempts being taken, the system may request that the CAPTCHA system 110 stop requesting attempts at transcribing the text within the box even though the pre-defined number has yet to be reached.

According to one embodiment, once text within a box has been confirmed, the box is stored in the CAPTCHA system 110 for further use as control text (as discussed above).

As described herein, accurate transcriptions of text from clipped boxes are provided at the output 116. The output 116 is in communication with the geographic data system 118. According to one embodiment, the geographic data system 118 is any system that stores and/or utilizes geographic information. For example, in one embodiment, the geographic data system to 188 is a database of geographic information that utilizes the accurately transcribed text received from the transcription system 100 to update and/or verify geographic information stored within the database. By receiving an accurate transcription of text known to have been recorded at a specific location, the geographic data system 118 can use the accurate transcription of text to update and/or verify geographic information (e.g., building numbers, building names, business names, street signs etc.) associated with the specific location. For example, an accurate transcription of text obtained from an image recorded at a specific location may be used by the geographic data system 118 (i.e. database) to confirm the location of a specific numbered or named building at that specific location.

As described herein, the geographic data system 118 is a database of geographic information; however, in other embodiments, any other geographic data system capable of utilizing the accurate transcriptions to enhance the accuracy of geographic location information may be used. For example, in one embodiment, the accurate transcriptions may be used by a geographic data system 118 to provide enhanced searching of geographic location information. In another embodiment, the geographic location information supplied by the accurate transcriptions may be used by a geographic data system 118 in providing targeted advertising.

Various embodiments according to the present invention may be implemented on one or more computer systems or other devices. A computer system may be a single computer that may include a minicomputer, a mainframe, a server, a personal computer, or combination thereof. The computer system may include any type of system capable of performing remote computing operations (e.g., cell phone, PDA, tablet, smart-phone, set-top box, or other system). A computer system used to run the operation may also include any combination of computer system types that cooperate to accomplish system-level tasks. Multiple computer systems may also be used to run the operation. The computer system also may include input or output devices, displays, or storage units. It should be appreciated that any computer system or systems may be used, and the invention is not limited to any number, type, or configuration of computer systems.

These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate operation of the described system according to various embodiments of the invention. Further, the system may be located on a single computer or may be distributed among a plurality of computers attached by a communications network.

Figure 3:
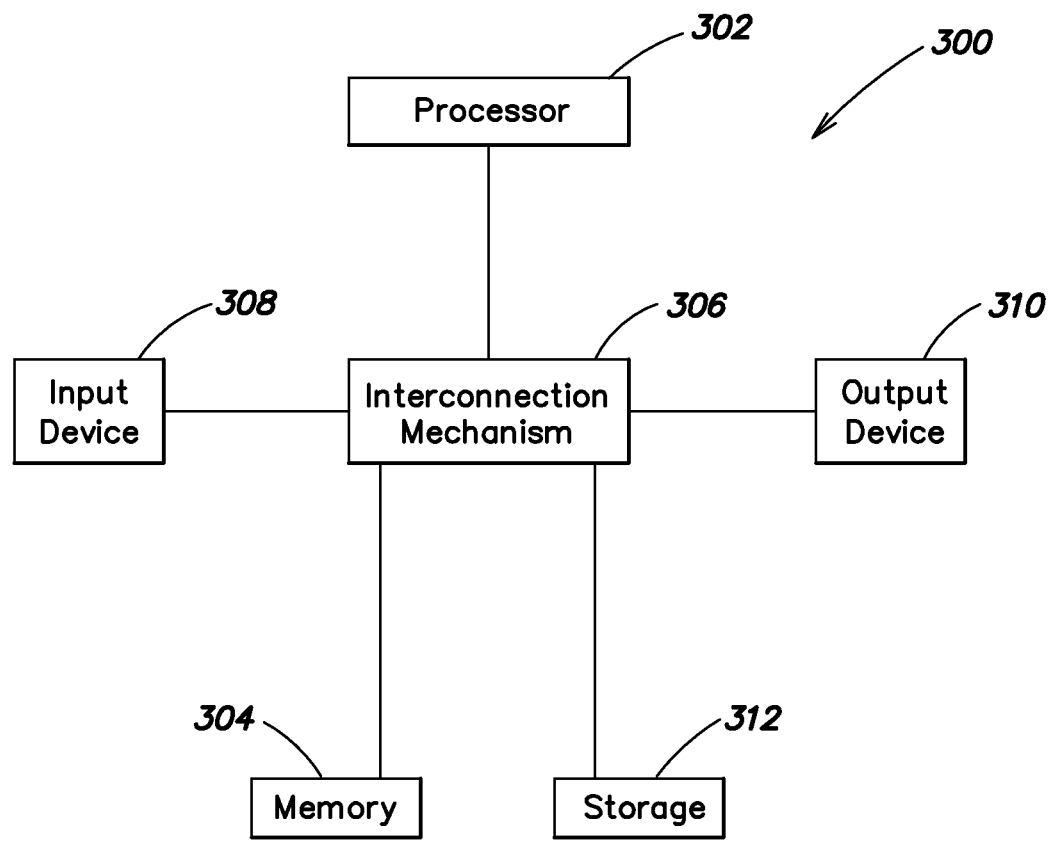
FIG. 3 is a block diagram of a general-purpose computer system upon which various embodiments of the invention may be implemented.

For example, various aspects of the invention may be implemented as specialized software executing in a general-purpose computer system 300 such as that shown in FIG. 3. The computer system 300 may include a processor 302 connected to one or more memory devices 304, such as a disk drive, memory, or other device for storing data. Memory 304 is typically used for storing programs and data during operation of the computer system 300. Components of computer system 300 may be coupled by an interconnection mechanism 306, which may include one or more busses (e.g., between components that are integrated within a same machine) and/or a network (e.g., between components that reside on separate discrete machines). The interconnection mechanism 306 enables communications (e.g., data, instructions) to be exchanged between system components of system 300. Computer system 300 also includes one or more input devices 308, for example, a keyboard, mouse, trackball, microphone, touch screen, and one or more output devices 310, for example, a printing device, display screen, and/or speaker. In addition, computer system 300 may contain one or more interfaces (not shown) that connect computer system 300 to a communication network (in addition or as an alternative to the interconnection mechanism 306).

Figure 4:
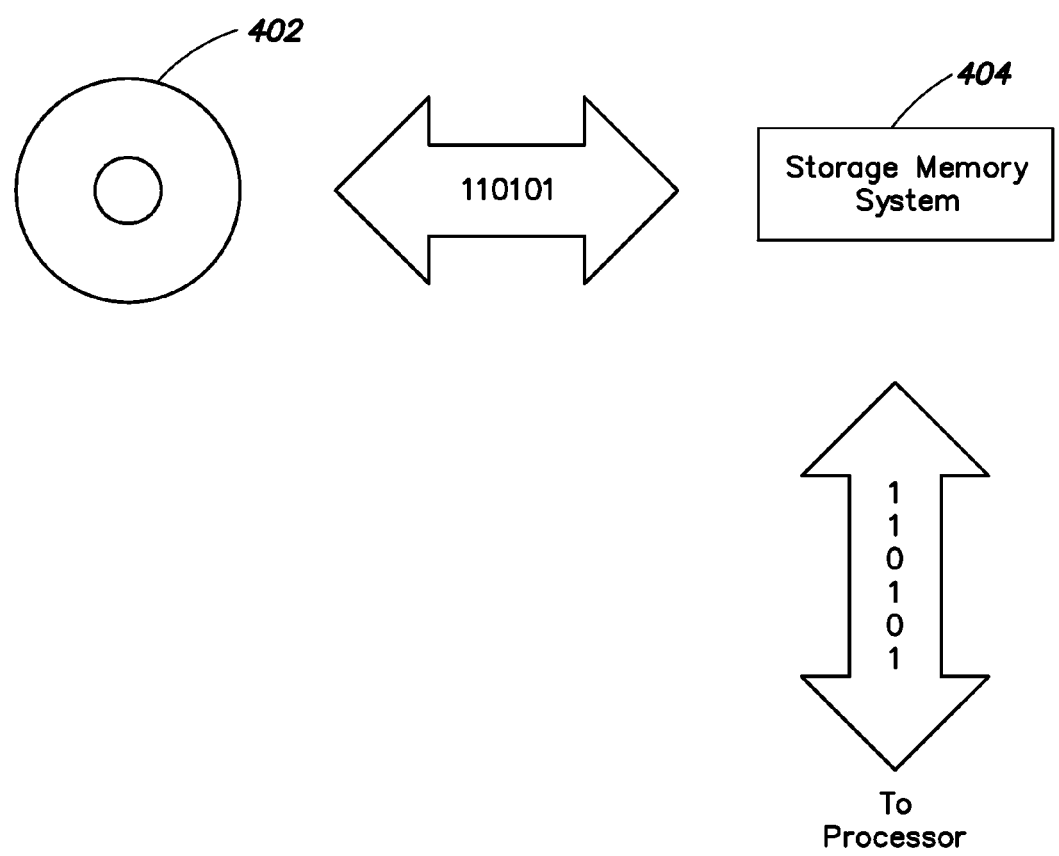
FIG. 4 is a block diagram of a computer data storage system with which various embodiments of the invention may be practiced.

The storage system 312, shown in greater detail in FIG. 4, typically includes a computer readable and writeable nonvolatile recording medium 402 in which signals are stored that define a program to be executed by the processor or information stored on or in the medium 402 to be processed by the program. The medium may, for example, be a disk or flash memory. Typically, in operation, the processor causes data to be read from the nonvolatile recording medium 402 into another memory 404 that allows for faster access to the information by the processor than does the medium 402. This memory 404 is typically a volatile, random access memory such as a dynamic random access memory (DRAM) or static memory (SRAM). It may be located in storage system 312, as shown, or in memory system 304. The processor 302 generally manipulates the data within the integrated circuit memory 304, 404 and then copies the data to the medium 402 after processing is completed. A variety of mechanisms are known for managing data movement between the medium 402 and the integrated circuit memory element 304, 404, and the invention is not limited thereto. The invention is not limited to a particular memory system 304 or storage system 312.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 300 is shown by way of example as one type of computer system upon which various aspects of the invention may be practiced, it should be appreciated that aspects of the invention are not limited to being implemented on the computer system as shown in FIG. 3. Various aspects of the invention may be practiced on one or more computers having a different architecture or components that shown in FIG. 3.

Computer system 300 may be a general-purpose computer system that is programmable using a high-level computer programming language. Computer system 300 may be also implemented using specially programmed, special purpose hardware. In computer system 300, processor 302 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP, or Windows Visa operating systems available from the Microsoft Corporation, MAC OS System X available from Apple Computer, the Solaris Operating System available from Sun Microsystems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCPIP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

As described herein, the CAPTCHA system 110 is located externally from the transcription system 100; however, according to one embodiment, the CAPTCHA system 110 is located within the transcription system 100 and communicates directly with the components of the transcription system 100, absent the need for the CAPTCHA system interface 108.

As described herein, the images received by the transcription system 100 are photographic images; however, in other embodiments, any other type of image including text of interest may be received by the transcription system 100.

As described above, various embodiments as described herein provide a system and method for utilizing the effort expended by a user in responding to a CAPTCHA request to automatically transcribe text from images in order to verify, retrieve and/or update geographic data or information associated with geographic location at which the images were retrieved.

Having thus described several aspects of at least one embodiment of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

What is claimed is:

1. A method for updating geographic data associated with a geographic location, the method comprising:
receiving, by one or more computing devices, at least one image recorded at the geographic location;
identifying, by the one or more computing devices, an area within the at least one image, the area including text, wherein identifying an area includes identifying coordinates of a location of the area within the at least one image;
transmitting, by the one or more computing devices, the area to one out of a group of Completely Automated Public Turing test to tell Computer and Humans Apart (CAPTCHA) systems, wherein a language associated with the geographic location is used to select the one out of the group of CAPTCHA systems;
receiving, by the one or more computing devices, a set of transcription attempts from the CAPTCHA system;
analyzing, by the one or more computing devices, the set of transcription attempts;
generating, by the one or more computing devices, a transcription of the text based on the act of analyzing; and
updating, by the one or more computing devices, the geographic data associated with the geographic location based on the transcription of the text associated with the identified coordinates of the location of the area within the at least one image.

2. The method of claim 1, wherein the act of updating geographic data includes updating at least one of a building name, a business name, and a building number associated with the geographic location based on the transcription of the text.

3. The method of claim 1, wherein the act of transmitting includes selectively transmitting the area to a CAPTCHA system based on the geographic location.

4. The method of claim 1, further comprising filtering the set of transcription attempts to remove erroneous transcription attempts.

5. The method of claim 4, wherein the act of filtering is based on the geographic location.

6. The method of claim 1, wherein the area includes a box.

7. The method of claim 1, wherein the act of analyzing includes acts of:
comparing the transcription attempts within the set; and
determining whether a pre-defined number of transcription attempts match each other.

8. The method of claim 7, wherein the act of generating includes, in response to a determination that the pre-defined number of transcription attempts match, generating the transcription of the text based on the matched transcription attempts.

9. The method of claim 1, wherein the act of analyzing includes acts of:
comparing the transcription attempts within the set; and
determining whether a pre-defined percentage of transcription attempts match each other.

10. The method of claim 9, wherein the act of generating includes, in response to a determination that the pre-defined percentage of transcription attempts match, generating the transcription of the text based on the matched transcription attempts.

11. The method of claim 1, further comprising adjusting at least one of the size, shape, and aspect ratio of the area.

12. The method of claim 1, wherein the at least one image is a photographic image.

13. A system for updating geographic data associated with a geographic location, the system comprising;
one or more computing devices;
an input of the one or more computing devices configured to receive at least one image recorded at the geographic location;
an extraction component of the one or more computing devices configured to encode the at least one image with an identification of an area within the image that includes text, wherein the area includes coordinates of a location of the area within the at least one image;
a clipping component of the one or more computing devices configured to remove the area from the at least one image;
an interface of the one or more computing devices configured to transmit the area to one out of a group of Completely Automated Public Turing test to tell Computer and Humans Apart (CAPTCHA) systems, wherein a language associated with the geographic location is used to select the one out of the group of CAPTCHA systems, and to receive a set of transcription attempts from the CAPTCHA system;
a merging component of the one or more computing devices configured to analyze the set of transcription attempts received from the CAPTCHA system and generate a transcription of the text based on the analysis of the set of transcription attempts; and
a database of the one or more computing devices configured to receive the transcription of the text associated with the coordinates of the location of the area within the at least one image and in response, update the geographic data associated with the geographic location stored within the database.

14. The system of claim 13, wherein the CAPTCHA system is a reCAPTCHA system.

15. The system of claim 13, further comprising a filter component configured to filter out erroneous transcription attempts from the set of transcription attempts.

16. The system of claim 15, wherein the image is further encoded with the geographic location.

17. The system of claim 16, wherein the filter component is further configured to filter the set of transcription attempts based on the geographic location.

18. The system of claim 13, further comprising a scaling component configured to adjust at least one of the size, shape, and aspect ratio of the area.

19. A non-transitory computer readable medium comprising computer-executable instructions that when executed on a processor performs a method for updating geographic data associated with a geographic location, the method comprising acts of:

receiving at least one image recorded at the geographic location;

identifying an area within the at least one image, the area including text, wherein identifying an area includes identifying coordinates of a location of the area within the at least one image;

transmitting the area to one out of a group of Completely Automated Public Turing test to tell Computer and Humans Apart (CAPTCHA) systems, wherein a language associated with the geographic location is used to select the one out of the group of CAPTCHA systems;

displaying the area to a plurality of users having access to the selected one out of the group of CAPTCHA systems;

recording a set of transcription attempts from the plurality of users;

analyzing the set of transcription attempts;

generating a transcription of the text based on the act of analyzing; and updating the geographic information related to the geographic location based on the transcription of the text associated with the identified coordinates of the location of the area within the at least one image.

* * * * *